United States Patent [19]

Hugl et al.

[11] 4,163,013
[45] Jul. 31, 1979

[54] DIPHENYLAMINE-AZO-HYDROCARBYL-SULFONYLPHENYL DYESTUFFS

[75] Inventors: Herbert Hugl; Karl H. Schündehütte, both of Leverkusen; Kersten Trautner, Cologne; Gerhard Wolfrum, Leverkusen, all of Fed. Rep. of Germany

[73] Assignee: Bayer Aktiengesellschaft, Leverkusen, Fed. Rep. of Germany

[21] Appl. No.: 813,315

[22] Filed: Jul. 6, 1977

[30] Foreign Application Priority Data

Jul. 9, 1976 [DE] Fed. Rep. of Germany ....... 2630990

[51] Int. Cl.$^2$ ............................................. C09B 43/18
[52] U.S. Cl. ................................... 260/206; 260/205; 260/207; 260/207.1; 260/152; 260/154; 260/156
[58] Field of Search ............ 260/205, 206, 207, 207.1, 260/152, 154, 156

[56] References Cited

U.S. PATENT DOCUMENTS

| 3,535,306 | 10/1970 | Altermatt et al. | 260/206 X |
| 3,741,954 | 6/1973 | Altermatt | 260/206 X |
| 3,926,946 | 12/1975 | Ridyard | 260/206 |
| 4,048,153 | 9/1977 | Van Assche | 260/206 X |

FOREIGN PATENT DOCUMENTS 2307179  8/1974  Fed. Rep. of Germany ........... 260/206

*Primary Examiner*—Charles F. Warren
*Attorney, Agent, or Firm*—Plumley and Tyner

[57] ABSTRACT

Disperse dyestuffs of the formula

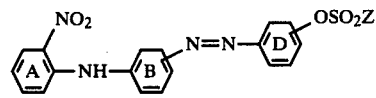

wherein
Z represents an optionally substituted hydrocarbon radical,
the azo group is in the meta-position or para-position relative to the amino group of the disphenylamine and the radical —OSO$_2$Z is in the ortho-position or para-position relative to the azo group.

The rings A, B and D can be further substituted.

The dyestuffs are suitable for dyeing synthetic fibre materials, especially polyesters, which are dyed in yellow to orange-red shades of good tinctorial strength and with good fastness properties in use, such as, for example, fastness to light and wet processing.

7 Claims, No Drawings

DIPHENYLAMINE-AZO-HYDROCARBYLSULFONYLPHENYL DYESTUFFS

The invention relates to nitroazo dyestuffs which are free from sulphonic acid groups and of the formula

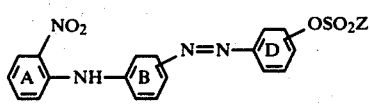

wherein
Z represents an optionally substituted hydrocarbon radical,
the rings A, B and D can contain further non-ionic substituents customary in azo dyestuff chemistry,
the azo group is in the meta-position or para-position relative to the amino group of the diphenylamine and the radical —OSO$_2$Z is in the ortho-position or para-position relative to the azo group,
as well as their preparation and use for dyeing hydrophobic fibre materials.

Suitable radicals Z are alkyl, aralkyl, cycloalkyl and, in particular, aryl radicals.

Preferred dyestuffs correspond to the formula

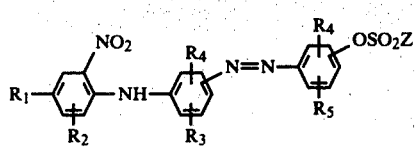

wherein
$R_1$ represents H, NO$_2$, CN, CF$_3$, halogen, alkyl, SO$_2$X$_1$, SO$_2$NX$_2$X$_3$, SO$_2$OX$_1$, CONX$_2$X$_3$, SCN, OX$_1$, SX$_1$ or NX$_2$X$_3$,
$R_2$ represents H, NO$_2$, halogen, alkyl, OX$_1$ or aryl,
$R_3$ and $R_4$ independently of one another represent H, halogen, alkyl, SO$_2$X$_1$, SO$_2$NX$_2$X$_3$, SO$_2$OX$_1$, COX$_1$, CONX$_2$X$_3$, NX$_2$X$_3$, OH, OX$_1$ or aryl,
$R_5$ represents H, halogen, alkyl, OX$_1$ or aryl and
$R_6$ represents H or alkyl,
and
$X_1$ denotes alkyl, aryl or aralkyl and
$X_2$ and $X_3$ independently of one another denote H, alkyl, cycloalkyl, aryl, aralkyl or the radical of a heterocyclic structure or, conjointly with the N atom, denote a 5-membered to 7-membered saturated heterocyclic structure.

In the dyestuffs according to the invention
the azo group is in the meta-position or para-position relative to the amino group of the diphenylamine,
the radical —OSO$_2$Z is in the ortho-position or para-position relative to the azo group and
Z has the abovementioned meaning.

The abovementioned alkyl, aralkyl, cycloalkyl and aryl radicals as well as the heterocyclic radicals can contain further non-ionic substituents.

Within the scope of this invention, suitable alkyl is, in particular, alkyl which has 1–4 C atoms and can optionally further be monosubstituted by cyano, halogen, such as chlorine, bromine or fluorine, hydroxyl or C$_1$–C$_4$-alkoxy, for example methyl, ethyl, n-propyl, iso-propyl, n-butyl, tert.-butyl, cyanoethyl or 2-chloroethyl.

Suitable aryl is, in particular, phenyl which is optionally monosubstituted to trisubstituted by halogen, C$_1$–C$_4$-alkyl and C$_1$–C$_4$-alkoxy.

Suitable alkoxy is, in particular, C$_1$–C$_4$-alkoxy, such as methoxy, ethoxy or butoxy.

Suitable halogen is chlorine, bromine or fluorine but preferably chlorine.

Suitable aralkyl is, for example, benzyl or phenethyl.

Suitable cycloalkyl is, for example, cyclopentyl, cyclohexyl and cycloheptyl.

A suitable heterocyclic radical is, for example, the 3-sulpholanyl radical or the 2-pyridyl radical.

Suitable radicals of heterocyclic structures which are formed by X$_2$ and X$_3$ with the inclusion of the N atom are piperidinyl, pyrrolidinyl and morpholinyl.

Particularly preferred dyestuffs are those of the formula

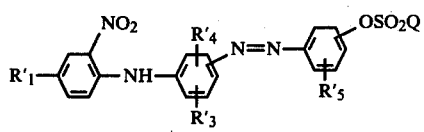

wherein
Q represents C$_1$–C$_8$-alkyl, aralkyl or aryl,
$R_1'$ represents H, NO$_2$, CN, CF$_3$, SO$_2$X$_1'$, SO$_2$NX$_2'$X$_3'$, SO$_2$OX$_1'$, COX$_1'$ or CONX$_1'$X$_2'$,
$R_3'$ represents H, halogen, C$_1$–C$_4$-alkyl, C$_1$–C$_4$-alkoxy or SO$_2$NX$_1'$X$_2'$,
$R_4'$ represents H, halogen, C$_1$–C$_4$-alkyl or C$_1$–C$_4$-alkoxy and
$R_5'$ represents H, halogen, C$_1$–C$_4$-alkyl or phenyl, and
$X_1'$ represents C$_1$–C$_4$-alkyl, phenyl, benzyl or phenethyl and
$X_2'$ and $X_3'$ independently of one another represent C$_1$–C$_4$-alkyl, phenyl, benzyl or phenethyl.

In the said dyestuffs, the azo group is in the meta-position or para-position relative to the amino group of the diphenylamine and the —OSO$_2$Q group is in the ortho-position or para-position relative to the azo group. The alkyl radicals mentioned can optionally be further substituted by chlorine and the phenyl radicals mentioned can be further substituted by chlorine, methyl, ethyl, methoxy or ethoxy.

Dyestuffs of the formula

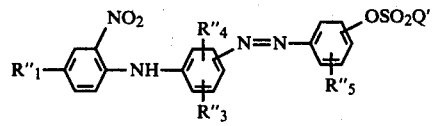

wherein
Q' represents phenyl, o-, m- or p-tolyl or o-, m- or p-chlorophenyl,
$R_1''$ represents H, NO$_2$, CF$_3$, SO$_2$X$_1'$, SO$_2$NX$_2'$X$_3'$ or SO$_2$OX$_1'$,
$R_3''$ and $R_4''$ independently of one another represent H, halogen, methyl, ethyl, methoxy and ethoxy and
$R_5''$ represents H, chlorine, C$_1$–C$_4$-alkyl or phenyl and
$X_1'$, $X_2'$ and $X_3'$ have the abovementioned meaning;
the azo group is in the meta-position or para-position relative to the amino group of the diphenylamine and the —OSO$_2$Q' group is in the ortho-position or para-position relative to the azo group, are very particularly preferred.

Amongst the said dyestuffs, in turn, those in which $R_1$, $R_1'$ and $R_1''$ represent hydrogen are preferred.

The dyestuffs can be prepared in a manner which is in itself known by various processes.

One process consists in diazotising an amine of the formula (V) and coupling the diazo compound with a phenol of the formula (VI) and esterifying the phenolic group of the azo compound (VII), which is thus obtained,

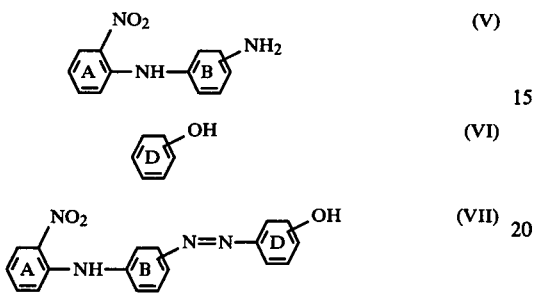

with an alkylsulphonyl halide, aralkylsulphonyl halide, cycloalkylsulphonyl halide or arylsulphonyl halide.

A further process is characterised in that a o-nitrohalogenobenzene of the formula (VIII) is subjected to a condensation reation with an aminoazo dyestuff of the formula (IX)

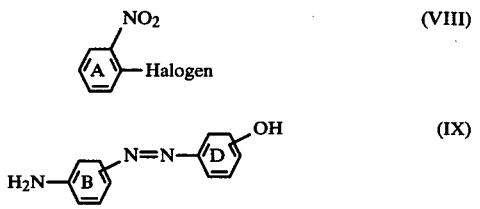

and the phenolic group in the condensation product (VII) is esterified with an alkylsulphonyl halide, aralkylsulphonyl halide, cycloalkylsulphonyl halide or arylsulphonyl halide.

Examples of suitable diazo components of the formula (V) are: 2-nitro-4'-aminodiphenylamine, 2-nitro-3'-methoxy-4'-aminodiphenylamine, 2-nitro-2'-methyl-4'-aminodiphenylamine, 2,4-dinitro-2',5'-dimethoxy-4'-aminodiphenylamine, 2,4-dinitro-4'-aminodiphenylamine, 2-nitro-4-dimethylaminosulphonyl-4'-aminodiphenylamine, 2-nitro-4-dibutylaminosulphonyl-3'-methoxy-4'-aminodiphenylamine, 2-nitro-4-methylethylaminosulphonyl-4'-aminodiphenylamine, 2-nitro-4-diphenylaminosulphonyl-2'-ethyl-4'-aminodiphenylamine, 2-nitro-4-benzylmethylaminosulphonyl-4'-aminodiphenylamine, 2-nitro-4-(N-2-phenethyl-N-methyl)-sulphamoyl-3'-methyl-4'-aminodiphenylamine, 2-nitro-4-ethylsulphonyl-4'-aminodiphenylamine, 2,6-dinitro-4-benzylsulphonyl-2',5'-dichloro-4'-aminodiphenylamine, 2-nitro-4-cyano-3'-methylsulphonyl-4'-aminodiphenylamine, 2-nitro-4-diethylamino-carbonyl-2',5'-dichloro-4'-aminodiphenylamine, 2-nitro-4-diphenylaminocarbonyl-4'-aminodiphenylamine, 2-nitro-4-morpholin-1-ylcarbonyl-4'-aminodiphenylamine, 2-nitro-4-pyrrolidin-1-ylcarbonyl-3'-methoxy-4'-aminodiphenylamine, 2-nitro-4-methoxycarbonyl-3'-chloro-4'-aminodiphenylamine, 2-nitro-4-carboxy-3'-dimethylamino-sulphonyl-4'-aminodiphenylamine, 2-nitro-4-cyano-4'-aminodiphenylamine, 2-nitro-4-butoxycarbonyl-3'-ethyl-4'-aminodiphenylamine, 2-nitro-4-sulpho-4'-aminodiphenylamine, 2-nitro-4-butoxycarbonyl-3'-ethyl-4'-aminodiphenylamine, 2-nitro-4-di-(2-cyanoethyl)-aminosulphonyl-4'-aminodiphenylamine, 2-nitro-4-morpholin-1-yl-sulphonyl-3'-methoxy-4'-aminodiphenylamine, 2-nitro-4-pyrrolidin-1-yl-sulphonyl-4'-aminodiphenylamine, 2,6-dinitro-3'-N-benzyl-N-methylsulphamoyl-4'-aminodiphenylamine, 2-nitro-4-methyl-(4-chlorophenyl)-amino-sulphonyl-3'-methyl-4'-aminodiphenylamine, 2-nitro-4-N-cyclohexyl-N-methylsulphamoyl-4'-aminodiphenylamine, 2,4-dinitro-2'-methoxy-4'-amino-5'-methyldiphenylamine, 2,4,6-trinitro-2'-chloro-4'-amino-5'-methoxy-diphenylamine, 2-nitro-4-cyano-4'-aminodiphenylamine, 2-nitro-4-trifluoromethyl-4'-aminodiphenylamine, 2-nitro-4-dimethylaminocarbonyl-3'-methoxy-4'-aminodiphenylamine, 2-nitro-4-benzylcarbonyl-3'-methyl-4'-aminodiphenylamine, 2-nitro-4-phenoxysulphonyl-4'-aminodiphenylamine, 2-nitro-4-butoxysulphonyl-2',5'-dichloro-4'-aminodiphenylamine, 2-nitro-4-benzyloxysulphonyl-4'-aminodiphenylamine, 2-nitro-4-thiocyanato-4'-aminodiphenylamine, 2-nitro-4-methoxy-4'-aminodiphenylamine, 2-nitro-4-phenoxy-3'-methyl-4'-aminodiphenylamine, 2-nitro-4-butylmercapto-4'-aminodiphenylamine, 2-nitro-4-(4-methylphenylmercapto)-4'-aminodiphenylamine, 2-nitro-4-diethylamino-4'-aminodiphenylamine, 2-nitro-4-methyl-3'-methoxy-4'-aminodiphenylamine, 2-nitro-3'-aminodiphenylamine, 2-nitro-3'-amino-4'-methyldiphenylamine, 2-nitro-3'-amino-4'-methoxy-diphenylamine, 2,4-dinitro-3'-aminodiphenylamine, 2,4-dinitro-3'-amino-4'-methyldiphenylamine, 2-nitro-4-cyano-3'-aminodiphenylamine, 2-nitro-4-trifluoromethyl-3'-aminodiphenylamine, 2-nitro-4-trifluoromethyl-3'-amino-4'-methoxy-diphenylamine, 2-nitro-4-phenylaminosulphonyl-3'-aminodiphenylamine, 2-nitro-4-methylsulphonyl-3'-amino-4'-chloro-diphenylamine, 2-nitro-4-phenoxysulphonyl-3'-aminodiphenylamine, 2-nitro-4-ethoxysulphonyl-3'-amino-4'-methyldiphenylamine, 2-nitro-4-methyl-ethylaminocarbonyl-3'-aminodiphenylamine, 2-nitro-4-phenoxycarbonyl-3'-aminodiphenylamine and 2-nitro-4-butoxy-3'-aminodiphenylamine.

Examples of suitable phenolic coupling components (VI) which may be mentioned are: phenol, o-cresol, m-cresol, p-cresol, 1-hydroxy-4-ethylbenzene, 1-hydroxy-4-tert.-butyl-benzene, 1-hydroxy-2-ethyl-benzene, 1-hydroxy-2-isopropyl-benzene, 1-hydroxy-2-sec.-butyl-benzene, 3-hydroxy-1,2-dimethyl-benzene, p-chlorophenol, 2-hydroxy-1,4-dimethyl-benzene, 4-hydroxy-1,2-dimethyl-benzene, 2-hydroxy-1,3-diethyl-benzene, 1-hydroxy-2-methoxy-benzene, 1-hydroxy-3-methoxy-benzene, m-chlorophenol, 4-hydroxy-diphenyl, 3-chloro-2-hydroxy-biphenyl, 1-hydroxy-3-ethoxy-benzene, 1-hydroxy-4-butoxy-benzene, 1-hydroxy-3-butoxybenzene, 2-hydroxy-diphenyl, o-chlorophenyl and 6-chloro-methylphenol.

Examples which may be mentioned of suitable acylating agents which introduce —$SO_2$-alkyl radicals are: methanesulphonic acid chloride, ethane-sulphonic acid chloride, butanesulphonic acid chloride, octane-sulphonic acid chloride, chloromethane-sulphonic acid chloride, chlorobutane-sulphonic acid chloride, dimethylamino-sulphonic acid chloride and the corresponding alkylsulphonic acid bromides.

Examples which may be mentioned of suitable acylating agents which introduce —$SO_2$-aryl radicals are: benzene-sulphonic acid chloride, o-, m- and p-chlorobenzene-sulphonic acid chloride, 3,4-dichloro-benzene-sulphonic acid chloride, 2,5-dichlorobenzene-sulphonic acid chloride, o-, m- and p-toluene-sulphonic acid chloride, o-, m- and p-nitro-benzene-sulphonic acid chloride, 4-chloro-3-nitro-benzene-sulphonic acid chloride, 2-chloro-5-nitro-benzene-sulphonic acid chloride, 4-chloro-2-toluenesulphonic acid chloride, 2-chloro-4-toluene-sulphonic acid chloride, 1,3-dimethyl-4-benzene-sulphonic acid chloride, 1- and 2-naphthalenesulphonic acid chloride, o-, m- and p-methoxybenzene-sulphonic acid chloride, o-, m- and p-ethoxy-benzene sulphonic acid chloride and the corresponding arylsulphonic acid bromides.

Examples which may be mentioned of suitable acylating agents which introduce —SO₂-aralkyl radicals are benzylsulphonic acid chloride or phenethylsulphonic acid chloride.

Examples of suitable acylating agents which introduce —SO₂-cycloalkyl radicals are cyclohexylsulphonic acid chloride or 3-chlorocyclohexylsulphonic acid chloride.

The condensation reaction of the o-nitrohalogenobenzenes (VIII) with the aminoazo dyestuffs (IX) to give the dyestuffs of the formula (VII) are carried out in a manner which is in itself known, for example in an aqueous medium with the addition of organic solvents, such as alcohols or glycols, in the presence of acid-binding agents, such as alkali metal carbonates, alkali metal bicarbonates, calcium carbonate or magnesium oxide. The condensation reaction can also be carried out under anhydrous conditions, for example in glycol or glycol monomethyl ether in the presence of sodium acetate or the abovementioned acid-binding agents. Temperatures of between 50° and 200° C. and preferably of between 80° and 150° C. are used for the condensation reaction.

The diazotisation of the diazo components (V) is carried out in a manner which is in itself known, for example in acid aqueous solution or suspensions with sodium nitrite solution and the diazotisation temperatures can be between 0° and 20° C., but preferably between 10° and 15° C. The diazotisation can also be carried out in organic solvents, such as, for example, methylene chloride, chloroform, trichloroethylene, dimethylformamide or dimethylsulphoxide.

The coupling reaction of the diazotised amines (V) with the phenols of the formula (VI) to give the azo dyestuffs (VII) is also carried out in the customary manner in an aqueous-alkaline or organic medium. The azo dyestuffs of the formula (VII) can be isolated by filtering off, if necessary after the addition of sodium chloride.

The esterification of the phenolic hydroxyl group with sulphonic acid halides is effected in a manner which is in itself known, for example in an aqueous-organic medium by adding the sulphonic acid halide to the dyestuff solution or suspension in an alkaline medium at temperatures of between 20° and 100° C. and preferably of between 40° and 70° C.

The dyestuffs according to the invention are very intense and are suitable for dyeing synthetic fibre materials, especially polyamides, such as, for example, polycaprolactam, polyhexamethylenediamine adipate or polyaminoundecanoic acid, but very particularly polyesters, such as polyethylene terephthalate and poly-1,4-cyclohexanedimethylene terephthalate, from aqueous liquors or organic solvents. The said types of fibre are dyed in yellow to orange-red shades of good tinctorial strength and with good fastness properties in use, such as, for example, fastness to light and wet processing.

EXAMPLE 1

229 g of 2-nitro-4'-amino-diphenylamine are suspended in 1.2 l of water and 200 ml of concentrated hydrochloric acid and 700 ml of a 10% strength sodium nitrite solution are added at 5°–10° C. The mixture is stirred for a further 1.5 hours at 5°–10° C. and the excess nitrite is then destroyed with amidosulphonic acid. This diazonium salt suspension is allowed to run into 110 g of m-cresol, dissolved in 400 ml of water, at 0°–5° C. and pH 10 and the pH value is kept at 10 by adding sodium hydroxide solution until the coupling reaction has ended. The resulting dyestuff of the formula

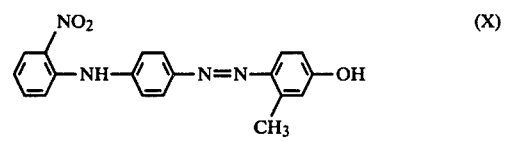

is filtered off, washed with water and dried at 80° C.

EXAMPLE 2

10 g of the dyestuff (X) are dissolved in 100 ml of glycol monomethyl ether. 8 g of benzenesulphonyl chloride are added dropwise at 50° C. and pH 10 and the pH value is kept at 10 during the addition. The mixture is stirred for a further 10 minutes at 50° C. and then allowed to cool and the resulting precipitate is filtered off. The product of the formula

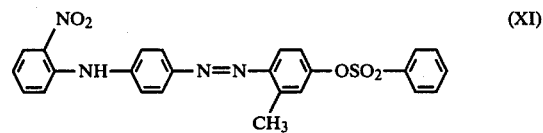

is washed with isopropanol and dried at 80° C.

DYEING EXAMPLES:

(1) 1 part of the dyestuff which was obtained according to Example 2 and finely dispersed according to customary processes is stirred into 2,000 parts of water. The pH value is adjusted to 5 to 6 with acetic acid and 4 parts of ammonium sulphate and 2 parts of a commercially available dispersing agent based on a naphthalenesulphonic acid/formaldehyde condensation product are added. 100 parts of a polyester fabric based on polyethylene glycol terephthalate are introduced into the dye liquor thus obtained and dyeing is carried out for 1½ hours at 120°–130° C. After subsequent rinsing, reductive after-treatment with a 0.2% strength alkaline solution of sodium dithionite for 15 minutes at 60° C., rinsing and drying, a reddish-tinged yellow dyeing with good fastness properties, and in particular good fastness to light and sublimation, is obtained.

(2) 100 parts of a fabric made of polyethylene terephthalate fibres are introduced, at room temperature, into a dyebath which has been prepared from 1 part of the monoazo dyestuff of Example 2 and 1,000 parts of tetrachloroethylene. The bath is heated to 110° C. in the course of 20 minutes, with vigorous circulation of the liquor, and kept at this temperature for 45 minutes. The liquor is then separated off and the fabric is rinsed with fresh tetrachloroethylene at 40° C. After separating off the rinsing liquor, the dyed goods are freed from adhering solvent by centrifuging and drying in a stream of air. A deep, reddish-tinged yellow dyeing with good general fastness properties is obtained.

(3) 0.1 g of the dyestuff according to Example 2, which has been dispersed well, is introduced, at 40° C., into 1 l of water which also contains 0.2 g of sodium dinaphthylmethanesulphonate and 0.3 g of cresotic acid methyl ester. 10 g of a fabric made of polyethylene terephthalate are introduced into this bath, the temperature of the dyebath is raised to 100° C. in the course of about 20 minutes and dyeing is carried out at this temperature for 60–90 minutes. A deep, reddish-tinged yellow dyeing with good fastness to sublimation and light is obtained.

Similar dyestuffs, which have properties similar to those of the dyestuff obtained according to Example 1 and 2, are obtained when the following diphenylamine diazo components are diazotised and coupled with the following coupling components and the phenolic hydroxyl group is then acylated with the indicated acylating agents. The dyestuffs dye synthetic fibre materials, such as polyesters and polyamides, in reddish-tinged yellow shades with good fastness properties, for example good fastness to light and wet processing.

| Example | Diazo component of the 2-nitro-4'-aminodiphenylamine series | Coupling component | Acylating agent |
|---|---|---|---|
| 3 | 3'-methoxy | m-cresol | p-chloro-benzene-sulphonic acid chloride |
| 4 | 2'-methyl | p-cresol | o-toluene-sulphonic acid chloride |
| 5 | 4-nitro-2',5'-dimethoxy | 2,6-diethylphenol | methane-sulphonic acid chloride |
| 6 | 4-nitro | o-cresol | phenethylsulphonic acid chloride |
| 7 | 4-dimethylaminosulphonyl | p-tert.-butylphenol | cyclohexylsulphonic acid chloride |
| 8 | 4-dibutylaminosulphonyl-3'-ethoxy | phenol | 2-chloro-4-toluene-sulphonic acid chloride |
| 9 | 4-nitro-5-chloro | p-chlorophenol | 1-naphthalenesulphonic acid chloride |
| 10 | 4-diphenylaminosulphonyl-2'-ethyl | o-sec.-butylphenol | benzene-sulphonic acid chloride |
| 11 | 4-benzylmethylaminosulphonyl | o-cresol | p-toluene-sulphonic acid bromide |
| 12 | 4(N-2-phenethyl-N-methyl)-aminosulphonyl-3'-methyl | m-ethoxyphenol | butane-sulphonic acid chloride |
| 13 | 4-ethylsulphonyl | p-cresol | 2,5-dichloro-benzene-sulphonic acid chloride |
| 14 | 4-benzylsulphonyl | m-cresol | benzene-sulphonic acid chloride |
| 15 | 4-cyano-2'-methylsulphonyl | phenol | p-nitro-benzene-sulphonic acid chloride |
| 16 | 4-diphenylaminocarbonyl | phenol | o-chloro-benzene-sulphonic acid chloride |
| 17 | 4-diethylaminocarbonyl-2',5'-dichloro | p-ethylphenol | chloro-butane-sulphonic acid chloride |
| 18 | 4-N-morpholin-1-yl-carbonyl | o-chlorophenol | dimethylamino-sulphonic acid chloride |
| 19 | 4-N-pyrrolidin-1-yl-carbonyl-3'-methoxy | o-phenylphenol | octane-sulphonic acid chloride |
| 20 | 4-methoxycarbonyl-3'-chloro | phenol | benzylsulphonic acid chloride |
| 21 | 4-ethoxy-3'-dimethylaminosulphonyl | m-cresol | m-chloro-benzenesulphonic acid chloride |
| 22 | 4-butoxycarbonyl-3'-ethyl | o-isopropylphenol | o-toluenesulphonic acid chloride |
| 23 | 4-di-(2-cyanoethyl)-aminosulphonyl | phenol | benzene-sulphonic acid chloride |
| 24 | 4-N-morpholin-1-yl-sulphonyl-3'-methoxy | m-cresol | methane-sulphonic acid chloride |
| 25 | 6-nitro-3'-benzylmethylamino-sulphonyl | phenol | m-toluene-sulphonic acid chloride |
| 26 | 4-p-chlorophenylmethylamino-sulphonyl-3'-methyl | o-ethylphenol | m-nitro-benzene-sulphonic acid chloride |
| 27 | 4-N-cyclohexyl-N-methylamino-sulphonyl | o-cresol | 3,4-dichloro-benzene-sulphonic acid chloride |
| 28 | 4-nitro-2'-methoxy-5'-methyl | m-cresol | p-toluene-sulphonic acid chloride |
| 29 | 4,6-dinitro-2'-chloro-5'-methoxy | p-cresol | p-chloro-benzene-sulphonic acid chloride |
| 30 | 4-dimethylaminosulphonyl | o-phenylphenol | benzene-sulphonic acid chloride |
| 31 | 4-benzylmethylaminosulphonyl | phenol | butane-sulphonic acid chloride |
| 32 | 4-diphenylaminosulphonyl | p-tert.-butylphenyl | o-toluene-sulphonic acid chloride |
| 33 | 4-N-butyl-N-ethylaminosulphonyl | m-ethylenephenol | methane-sulphonic acid chloride |
| 34 | 4-nitro | p-phenylphenol | 4-chloro-3-nitro-benzene-sulphonic acid chloride |
| 35 | 4-(N-2-phenethyl-N-ethyl)-aminosulphonyl | phenol | p-toluene-sulphonic acid chloride |
| 36 | 4-(N-3'-sulpholanyl)-sulphamoyl | p-cresol | chlorobutane-sulphonic acid chloride |
| 37 | 4-phenoxysulphonyl | phenol | benzenesulphonic acid chloride |
| 38 | 4-ethoxysulphonyl | m-cresol | methanesulphonic acid chloride |
| 39 | 4-phenoxysulphonyl | m-cresol | p-toluenesulphonic acid chloride |
| 40 | 4-benzyloxysulphonyl | phenol | benzenesulphonic acid bromide |
| 41 | 4-phenoxycarbonyl | phenol | m-chloro-benzene-sulphonic acid chloride |
| 42 | 4-cyano | m-chlorophenol | benzenesulphonic acid chloride |
| 43 | 4-trifluoromethyl | 4-hydroxy-diphenyl | p-toluenesulphonic acid chloride |
| 44 | 4-dimethykaminocarbonyl-3'-methoxy | 3-chloro-2-hydroxy-diphenyl | methane-sulphonic acid chloride |
| 45 | 4-benzylcarbonyl-3'-methyl | phenol | o-chloro-benzene-sulphonic acid chloride |
| 46 | 4-thiocyanato | o-cresol | m-toluene-sulphonic acid chloride |
| 47 | 4-methoxy | 9-chlorophenol | benzenesulphonic acid chloride |
| 48 | 4-phenoxy-3'-methyl | 1-hydroxy-4-ethyl-benzene | butanesulphonic acid chloride |
| 49 | 4-butylmercapto | p-cresol | o-toluene-sulphonic acid chloride |
| 50 | 4-(p-toluenemercapto) | 4-hydroxy-diphenyl | 2,5-dichloro-benzene-sulphonic acid chloride |
| 51 | 4-diethylamino | m-cresol | octane-sulphonic acid chloride |
| 52 | 4-methyl-3'-methoxy | phenol | benzenesulphonic acid chloride |
| 53 | | p-cresol | p-toluene-sulphonic acid chloride |

| | | -continued | |
|---|---|---|---|
| 54 | -4'-methyl | o-chlorophenol | methane-sulphonic acid chloride |
| 55 | -4'-methoxy | 4-hydroxy-diphenyl | benzenesulphonic acid chloride |
| 56 | 4-nitro | m-cresol | o-toluene-sulphonic acid chloride |
| 57 | 4-nitro-4'-methyl | p-chlorophenol | o-nitro-benzene-sulphonic acid chloride |
| 58 | 4-cyano | phenol | benzenesulphonic acid chloride |
| 59 | 4-trifluoromethyl | o-cresol | p-chloro-benzene-sulphonic acid chloride |
| 60 | 4-trifluoromethyl-4'-methoxy | 1-hydroxy-4-ethyl-benzene | butane-sulphonic acid chloride |
| 61 | 4-phenylaminosulphonyl | p-cresol | o-toluene-sulphonic acid chloride |
| 62 | 4-methylsulphonyl-4'-chloro | m-chlorophenol | m-chloro-benzene-sulphonic acid chloride |
| 63 | 4-phenoxysulphonyl | phenol | benzenesulphonic acid chloride |
| 64 | 4-ethoxysulphonyl-4'-methyl | 4-hydroxy-1,2-dimethyl-benzene | methane-sulphonic acid chloride |
| 65 | 4-methylethylaminocarbonyl | o-cresol | m-nitro-benzene-sulphonic acid chloride |
| 66 | 4-phenoxycarbonyl | p-cresol | p-toluene-sulphonic acid chloride |
| 67 | 4-butoxy | 3-hydroxy-1,2-dimethyl-benzene | benzenesulphonic acid chloride |

We claim:

1. Azo dyestuffs according to the formula

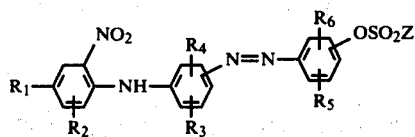

wherein
$R_1$ represents H, $NO_2$, CN, $CF_3$, halogen, $C_1$-$C_4$-alkyl, $SO_2X_1$, $SO_2OX_1$, $CONX_2X_3$, SCN, $OX_1$, $SX_1$ or $NX_2X_3$,
$R_2$ represents H, $NO_2$, halogen, $C_1$-$C_4$-alkyl, $OX_1$ or phenyl,
$R_3$ and $R_4$ independently of one another represent H, halogen, $C_1$-$C_4$-alkyl, $SO_2X_1$, $SO_2OX_1$, $COX_1$, $CONX_2X_3$, $NX_2X_3$, OH, $OX_1$ or phenyl,
$R_5$ represents H, halogen, $C_1$-$C_4$-alkyl, $OX_1$ or phenyl,
$R_6$ represents H or $C_1$-$C_4$-alkyl,
$X_1$ denotes $C_1$-$C_4$-alkyl, phenyl, benzyl or phenethyl,
$X_2$ and $X_3$ independently of one another denote H, $C_1$-$C_4$-alkyl, $C_5$-$C_7$-cycloalkyl, phenyl, benzyl, phenethyl or the radical of a heterocyclic structure or, conjointly with the N atom, denote a 5-membered to 7-membered saturated heterocyclic structure,
Z represents $C_1$-$C_4$-alkyl, benzyl, phenethyl, $C_5$-$C_7$-cycloalkyl or phenyl, and the above-mentioned alkyl, benzyl, phenethyl, cycloalkyl and phenyl radicals as well as the heterocyclic radicals can contain further non-ionic substituents.

2. Azo dyestuffs according to claim 1, of the formula

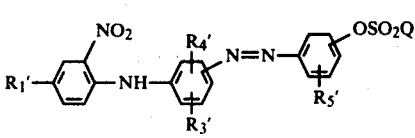

wherein
Q represents $C_1$-$C_8$-alkyl, aralkyl or aryl,
$R_1'$ represents H, $NO_2$, CN, $CF_3$, $SO_2X_1'$, $SO_2OX_1'$, $COX_1'$ or $CONX_1'X_2'$,
$R_3'$ represents H, halogen, $C_1$-$C_4$-alkyl or $C_1$-$C_4$-alkoxy,
$R_4'$ represents H, halogen, $C_1$-$C_4$-alkyl or $C_1$-$C_4$-alkoxy and
$R_5'$ represents H, halogen, $C_1$-$C_4$-alkyl or phenyl, and
$X_1'$ represents $C_1$-$C_4$-alkyl, phenyl, benzyl or phenethyl and
$X_2'$ and $X_3'$ independently of one another represent $C_1$-$C_4$-alkyl, phenyl, benzyl or phenethyl and the said alkyl radicals can optionally be further substituted by chlorine and the said phenyl radicals can be further substituted by chlorine, methyl, ethyl, methoxy or ethoxy.

3. The azo dyestuffs of claim 1 in which said $C_1$-$C_4$-alkyl is unsubstituted or substituted with cyano, halogen, hydroxy or $C_1$-$C_4$-alkoxy; said phenyl is unsubstituted or mono-, di- or tri-substituted with $C_1$-$C_4$-alkyl or $C_1$-$C_4$-alkoxy; and said benzyl, phenethyl, cycloalkyl and heterocyclic radicals being unsubstituted.

4. The azo dyestuffs of claim 1 in which
$X_2$ and $X_3$ independently of one another denote H, $C_1$-$C_4$-alkyl, $C_5$-$C_7$-cycloalkyl, phenyl, benzyl or phenethyl and the alkyl, phenyl, benzyl, phenethyl and cycloalkyl radicals can contain further non-ionic substituents.

5. Azo dyestuffs according to claim 1 of the formula

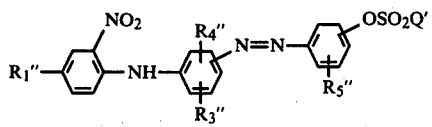

wherein
Q' represents phenyl, o-, m- or p-tolyl or o-, m- or p-chlorophenyl,
$R_1''$ represents H, $NO_2$, $CF_3$, $SO_2X_1'$, or $SO_2OX_1'$,
$R_3''$ and $R_4''$ independently of one another represent H, halogen, methyl, ethyl, methoxy and ethoxy, and
$R_5''$ represents H, chlorine, $C_1$-$C_4$-alkyl or phenyl,
$X_1'$ represents $C_1$-$C_4$-alkyl, phenyl, benzyl or phenethyl, and
$X_2'$ and $X_3'$ independently of one another represent $C_1$-$C_4$-alkyl, phenyl, benzyl or phenethyl, and
the said alkyl radicals can optionally be further substituted by chlorine and the said phenyl radicals can be further substituted by chlorine, methyl, ethyl, methoxy or ethoxy.

6. Azo dyestuff according to claim 1, of the formula

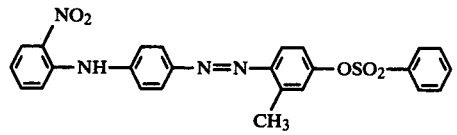
7. Azo dyestuff according to claim 1, of the formula
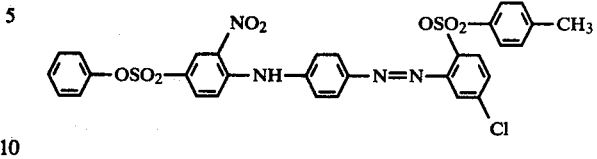
* * * * *